United States Patent
Leigh et al.

(10) Patent No.: US 9,927,584 B2
(45) Date of Patent: Mar. 27, 2018

(54) OPTICAL BLIND-MATE CONNECTOR AND ADAPTER

(71) Applicant: HEWLETT PACKARD ENTERPRISE DEVELOPMENT LP, Houston, TX (US)

(72) Inventors: Kevin B Leigh, Houston, TX (US); George D Megason, Houston, TX (US); Arlen L Roesner, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/717,380

(22) Filed: Sep. 27, 2017

(65) Prior Publication Data

US 2018/0017737 A1    Jan. 18, 2018

Related U.S. Application Data (62) Division of application No. 15/024,957, filed as application No. PCT/US2013/062621 on Sep. 30, 2013, now Pat. No. 9,798,092.

(51) Int. Cl.
  *G02B 6/36*    (2006.01)
  *G02B 6/38*    (2006.01)
  *G02B 6/42*    (2006.01)

(52) U.S. Cl.
  CPC ......... *G02B 6/3849* (2013.01); *G02B 6/3893* (2013.01); *G02B 6/4296* (2013.01); *G02B 2006/4297* (2013.01)

(58) Field of Classification Search
  CPC .. G02B 6/3849; G02B 6/3893; G02B 6/4296; G02B 2006/4297
  USPC ...................................... 385/15–94
  See application file for complete search history.

(56) References Cited

U.S. PATENT DOCUMENTS

| | | | | |
|---|---|---|---|---|
| 5,363,460 A | * | 11/1994 | Marazzi | G02B 6/3825 385/55 |
| 5,506,922 A | * | 4/1996 | Grois | G02B 6/3825 385/75 |
| 5,687,268 A | * | 11/1997 | Stephenson | G02B 6/3825 385/73 |
| 6,076,975 A | * | 6/2000 | Roth | G02B 6/3825 385/60 |
| 6,206,577 B1 | * | 3/2001 | Hall, III | G02B 6/3825 385/53 |
| 6,240,229 B1 | * | 5/2001 | Roth | G02B 6/3825 385/53 |
| 6,425,694 B1 | * | 7/2002 | Szilagyi | G02B 6/3849 385/139 |

(Continued)

*Primary Examiner* — Ryan Lepisto
*Assistant Examiner* — Guy Anderson
(74) *Attorney, Agent, or Firm* — Hewlett Packard Enterprise Patent Department (57) ABSTRACT

Described are examples of optical blind-mate connector adaptors, optical blind-mate connectors to blind-mate to the adaptors, and optical blind-mate systems. In various implementations, an optical blind-mate connector adapter may include a sleeve housing and a shutter mounted at an opening of the sleeve housing. The shutter may include a shutter flap to cover the opening in a closed position and a shutter tab to receive a force to move the shutter flap from the closed position to an open position extending away from the sleeve housing.

11 Claims, 14 Drawing Sheets

(56) References Cited

U.S. PATENT DOCUMENTS

| | | | |
|---|---|---|---|
| 6,572,274 B1* | 6/2003 | Margaliot | G02B 6/3849 385/75 |
| 6,595,696 B1* | 7/2003 | Zellak | G02B 6/3825 385/72 |
| 6,685,362 B2* | 2/2004 | Burkholder | G02B 6/3825 385/78 |
| 6,702,477 B1* | 3/2004 | Ngo | G02B 6/3825 385/55 |
| 6,712,523 B2* | 3/2004 | Zimmel | G02B 6/266 385/55 |
| 6,793,399 B1* | 9/2004 | Nguyen | G01M 11/088 356/241.1 |
| 7,340,146 B2* | 3/2008 | Lampert | G02B 6/3849 385/134 |
| 7,676,133 B2* | 3/2010 | Lampert | G02B 6/3849 220/254.1 |
| 2003/0147597 A1* | 8/2003 | Duran | G02B 6/3825 385/76 |
| 2003/0180005 A1* | 9/2003 | McBride | G02B 6/3825 385/73 |
| 2004/0179787 A1* | 9/2004 | Glazowski | G02B 6/3849 385/76 |
| 2005/0058402 A1* | 3/2005 | Ernst | G02B 6/3897 385/56 |
| 2006/0153503 A1* | 7/2006 | Suzuki | G02B 6/3807 385/53 |
| 2008/0056647 A1* | 3/2008 | Margolin | G02B 6/4201 385/89 |
| 2008/0260332 A1* | 10/2008 | Murano | G02B 6/3831 385/56 |
| 2010/0054665 A1* | 3/2010 | Jones | G02B 6/3825 385/59 |
| 2011/0317976 A1* | 12/2011 | Eckstein | G02B 6/3825 385/139 |
| 2012/0321254 A1* | 12/2012 | Wang | G02B 6/3849 385/75 |
| 2015/0378109 A1* | 12/2015 | Samal | G02B 6/3809 385/58 |

* cited by examiner

FIG. 5C

OPTICAL BLIND-MATE CONNECTOR AND ADAPTER

BACKGROUND

Optical communications are increasingly used in systems to achieve data communication with a greater bandwidth and/or lower electromagnetic interference as compared to electrical communications. In some systems, optical and electrical communication interconnections may be used. Optical fibers may be employed for optical input/output, and for some applications, optical fibers may be coupled to other optical fibers and/or system components by an optical connector.

BRIEF DESCRIPTION OF THE DRAWINGS

The detailed description section references the drawings, wherein.

all in which various embodiments may be implemented.

Certain examples are shown in the above-identified figures and described in detail below. The figures are not necessarily to scale, and various features and views of the figures may be shown exaggerated in scale or in schematic for clarity and/or conciseness.

DETAILED DESCRIPTION OF EMBODIMENTS

Optical transmission systems may be employed to interconnect network elements. Optical connectors include optical fibers, which may be connected end-to-end to transfer light or optical power therebetween. The fibers may be terminated in connector assemblies and may be mated by an adapter. Some such optical connection systems may include blind-mating connectors and adapters in which the connector and adapter are mated without necessarily having any visual and/or tactile indications that the connector and adapter are properly aligned. In some cases, a module may include optical connectors and electrical connectors to simultaneously blind-mate to their corresponding adapters.

Optical modules are sometimes enclosed in an electronic module enclosure along with other components. Server enclosures, for example, may include a plurality of bays that house individual blade servers, optical modules, power supply modules, among other components. Often, fans and other cooling components may be provided as electronic systems may tend to generate a large amount of heat.

In some electronic module enclosure arrangements, an optical module may be coupled to another optical component via an optical blind-mate adapter. Air flow leakage, however, may tend to occur, particularly when no optical modules are connected to an adapter of the mid-plane or when only one optical module is connected to an adapter. In addition, the adapter openings may allow dust to infiltrate the system or accumulate onto an optical fiber contact end when an optical module is absent on the other side of the adapter. Furthermore, there is a possibility of eye safety issues for human operators when an optical module is absent on the other side of the adapter.

Described herein are optical blind-mate connector adapters, optical blind-mate connectors, and optical blind-mate systems to provide air flow management, dust management, and eye safety. In various implementations, an optical blind-mate connector adapter may include a sleeve housing and a shutter mounted on a pivot at an opening of the sleeve housing, and an optical blind-mate connector may include an actuator to engage a shutter tab of the shutter to move a shutter flap of the shutter to an open position extending away from the sleeve housing. In various implementations, the optical blind-mate connector adapter may include a pair of shutters at each of the openings at the distal ends of the sleeve housing, wherein each pair is configured to cooperatively cover the respective opening of the sleeve.

Figure 1A:
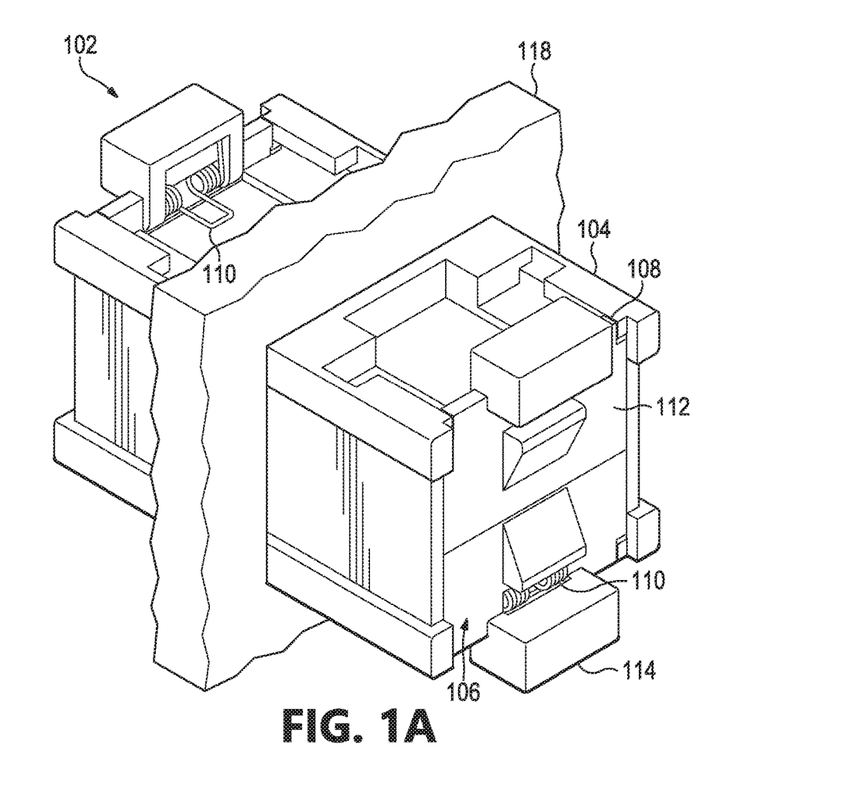
FIG. 1A-1D illustrate various views of an example optical blind-mate connector adapter.
Figure 1B:
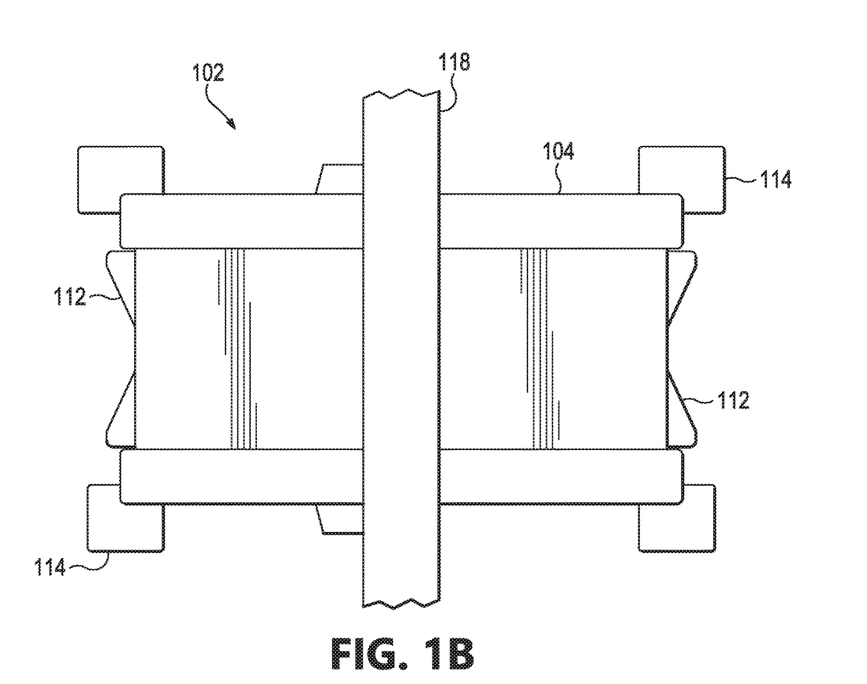
Figure 1C:
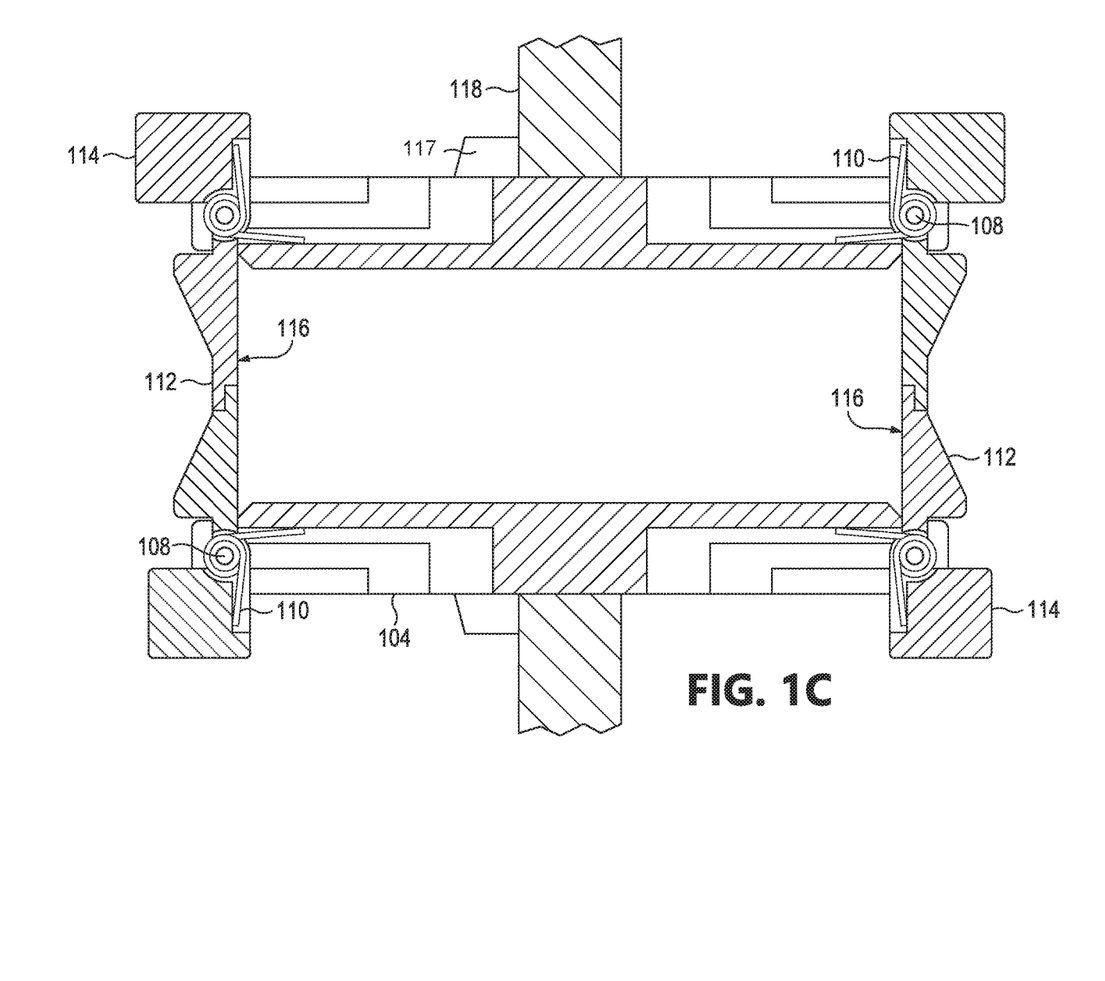
Figure 1D:
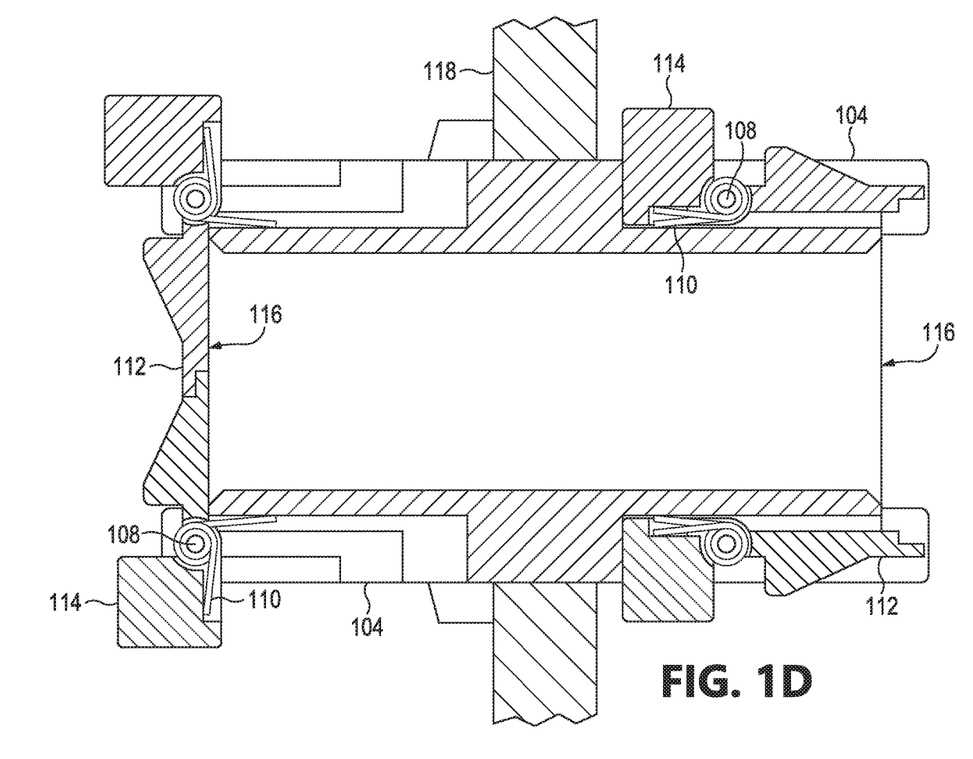

Turning now to FIG. 1A-1D, illustrated are views of an example apparatus including an optical blind-mate connector adapter 102. More particularly, FIG. 1A is a perspective view, FIG. 1B is a side view, and FIG. 1C and 1D are cross-section views of the apparatus. The optical blind-mate connector adapter 102 may include a sleeve housing 104 including a plurality of shutters 106 individually moveable between a closed position (as shown in FIG. 1A-1C) and an open position (as shown in FIG. 1D) to blind-mate to an optical connector, as described more fully herein.

The shutters 106 may each be mounted on a pivot 108 and the sleeve housing 104 may include biasing member 110 to bias the shutters 106 to the closed position yet allow the shutters 106 to be moved to the open position. In various implementations, the shutters 106 may include a shutter flap 112 to cover the openings of the sleeve housing 104 and a shutter tab 114 to receive a force (from an optical blind-mate connector, for example) to urge the shutter flap 112 from the closed position to the open position.

In various implementations, the optical blind-mate connector adapter 102 may include two pairs of shutters 106, a pair mounted at each of the distal ends of the sleeve housing 104, as shown. In some implementations, the shutters 106 of a pair may be arranged to cooperatively cover the respective opening 116 of the sleeve housing 104. In most implementations, the shutters 106 of a pair may be arranged to cooperatively cover an entirety of their respective openings 116 of the sleeve housing 104. In various ones of these implementations, the shutter flaps 112 of a pair of the shutters 106 may overlap when in the closed position.

In some implementations, the outside facing surface of the shutters 106 may include a film (not shown), which may provide additional dust protection. In some of these implementations, the film may be oversized to help further seal around the perimeters of the shutters 106. In some other implementations, the inside facing surface of the shutters 106 may be coated, pasted, or painted with material, or shaped, to prevent optical signal reflection.

In various implementations, the optical blind-mate connector adapter 102 may be mounted onto a circuit board or stationary plane, such as, for example, a mid-plane board 118, shown in partial view in FIG. 1A-1D, with one of the openings 116 of the sleeve housing 104 disposed at a first side of the mid-plane board 118, resting on the sleeve collar 117 when it is fully installed on the mid-plane board 118, and the other opening 116 disposed at a second side of the mid-plane board 118 to allow optical modules to couple through the adapter 102, which will be described and shown in more detail herein. The integrated shutters 106 may provide for restriction of air-flow, dust, and/or light (e.g., from a fiber optic cable) through the adapter 102, independently on each side of the adapter 102, particularly when only optical module is inserted into the adapter 102 or when no optical modules are inserted into the adapter 102.

Figure 2:
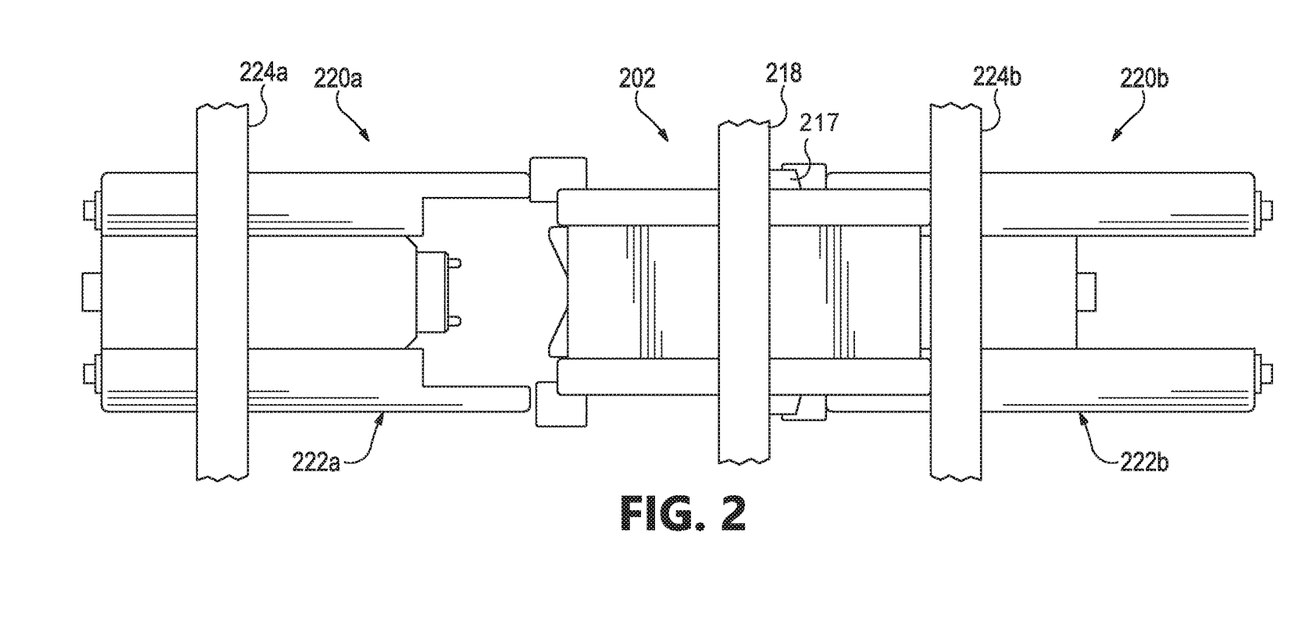
FIG. 2 illustrates another example optical blind-mate connector adapter mated to an example optical blind-mate connector.

FIG. 2 illustrates an example system including a first optical module 220a, which may be connected to a second optical module 220b via an optical blind-mate adapter 202. An optical connector 222a of the first optical module 220a may be blind-mated to one side of the adapter 202, and an optical connector 222b of the second optical module 220b may be blind-mated to the other side of the adapter 202.

The adapter 202 may be mounted onto a stationary plane or mid-plane circuit board 218 by securing the sleeve collar 217 for example by mounting screws. The connectors 222a, 222b may each be mounted onto respective circuit board or module bulkhead mounting panel board 224a, 224b to form the optical modules 220a, 220b. In some implementations, one or both of the optical modules 220a, 220b may comprise a system module, and in some implementations, the system module may include high-power active components. In various implementations, one of the optical modules 220a, 220b may comprise a system module while the other one of the optical modules 220a, 220b may comprise a connectivity module with a few or no active components. In various implementations, the planes of the boards 224a, 224b of the optical modules 220a, 220b may be oriented parallel to each other, as illustrated, or may be orthogonal to each other. In various ones of these implementations, the planes of board 224a or 224b of the optical modules 220a, 220b may be oriented orthogonally or parallel to the mid-plane circuit board 218.

Although not illustrated, the mid-plane circuit board 218 may include an electrical blind-mate adapter in addition to the optical adapter 202. In various implementations, the optical modules 220a, 220b may include electrical connectors (not shown) in addition to the optical connectors 222a, 222b, and the electrical connectors may be configured to simultaneously blind-mate with the electrical adapter(s) of the mid-plane circuit board 218.

Figure 3A:
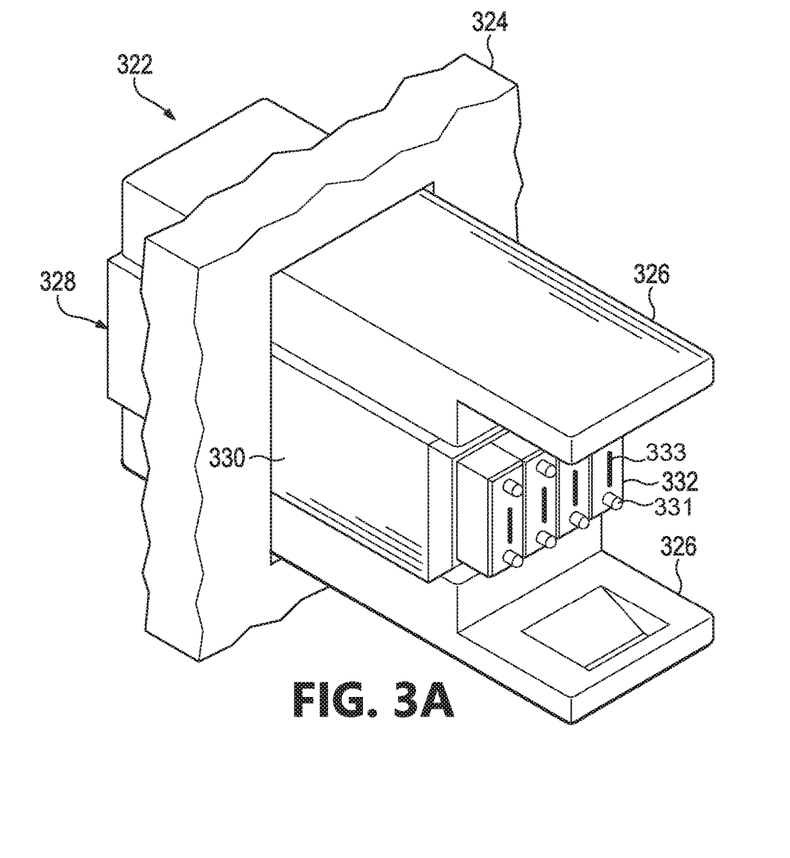
FIG. 3A-3D illustrate various views of another example optical blind-mate connector.
Figure 3B:
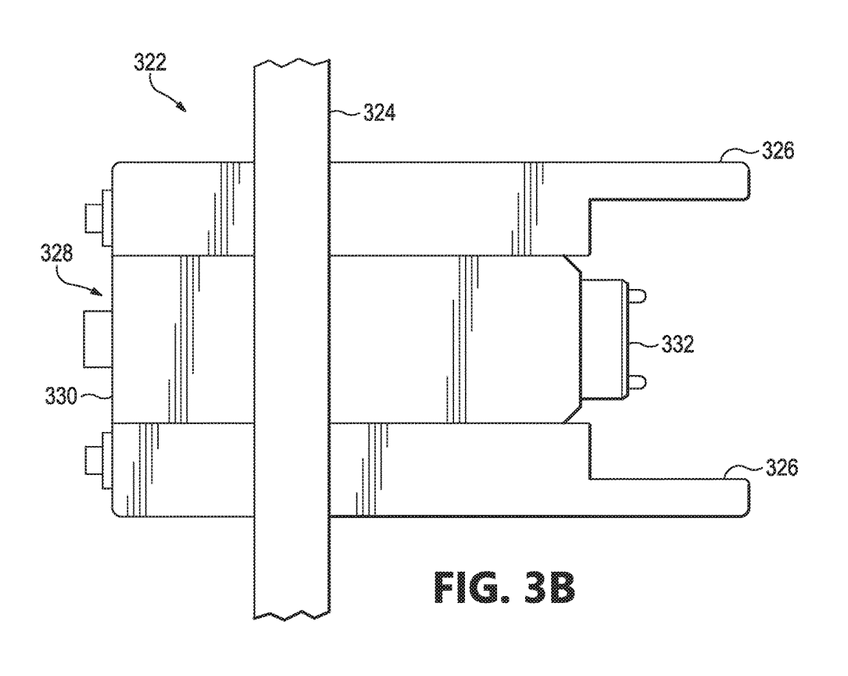
Figure 3C:
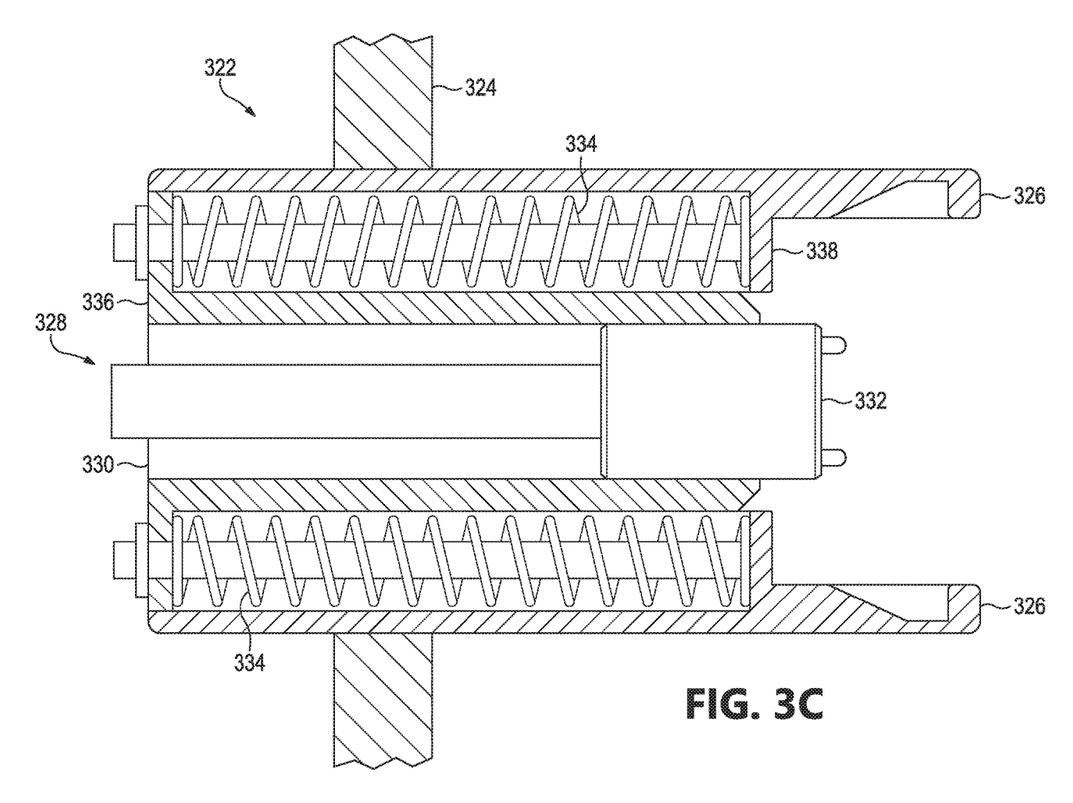

FIG. 3A-3C illustrate various views of another example optical module including an optical blind-mate connector 322 mounted on a module bulkhead mounting panel board 324. In particular, FIG. 3A illustrates a perspective view of the module, FIG. 3B illustrates a side view of the module, and FIG. 3C illustrates a cross-section view of the module.

As illustrated, the connector 322 may include an actuator 326 and an optical ferrule assembly 328 slidably coupled to the actuator 326. In various implementations and as shown, the connector 322 may include a pair of actuators 326 slidably coupled to the optical ferrule assembly 328. The optical ferrule assembly 328 may include a housing 330 and at least one ferrule 332 disposed at least in part in the housing 330. The ferrule 332 may hold a plurality of optical fibers (not shown). In various implementations, at least one of the ferrules 332 may be exposed at an end of the housing 330 to allow the ferrules 332 to optically couple to another connector (not shown here). Each ferrule 332 may have ferrule alignment features 331 for final alignment of the mating ferrule pair. The ferrule alignment features 331 may be protruding feature on one ferrule and recessed feature on the other ferrule. Each ferrule 332 may include optical signal elements 333. An optical signal element 333 may be a shaped and polished end of a fiber or an expanded beam lens. The ferrule alignment features 331 may provide the mechanism for the optical signal elements 333 of the mated ferrule pair to communicatively couple with minimum signal loss.

Figure 3D:
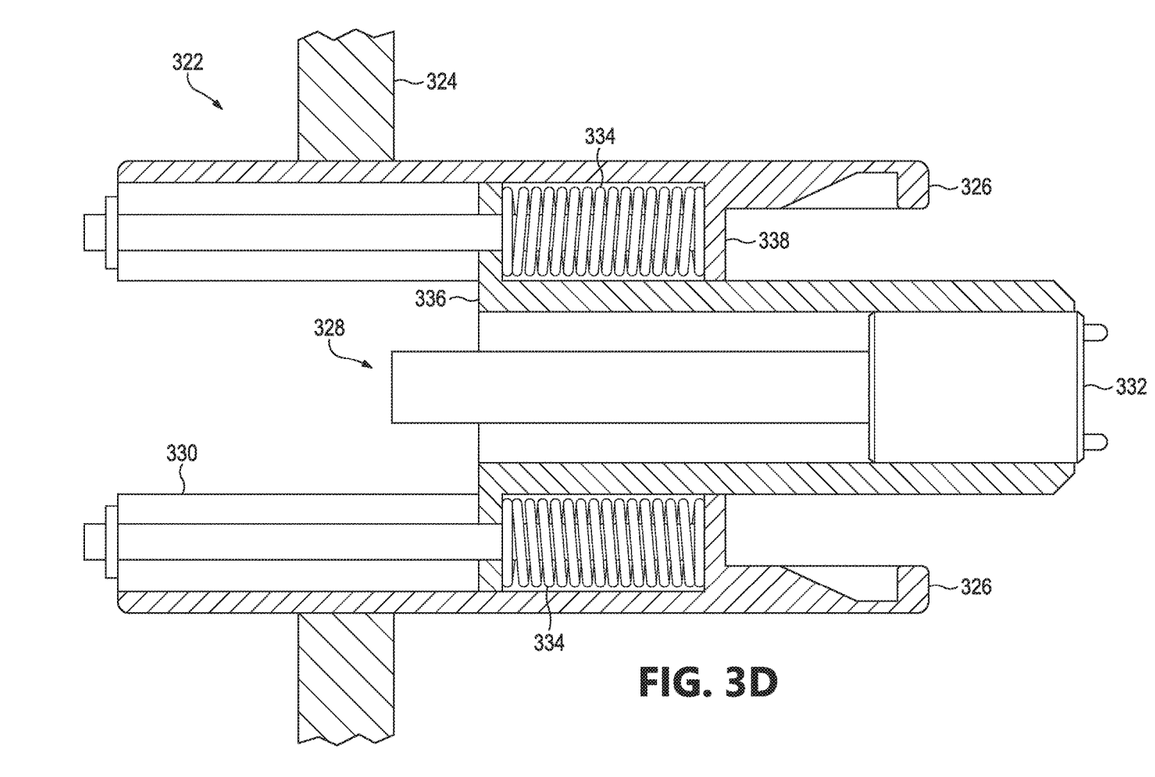

The connector 322 may include a biasing member 334 to urge the optical ferrule assembly 328 into the retracted position shown in FIG. 3A-3C. The biasing member 334 may comprise a spring, elastomer, or the like, and may arranged to compress between a wall 336 of the housing 330 and a wall 338 of the actuator 326 when the optical ferrule assembly 328 moves to an extended position, as shown in FIG. 3D, so as to urge the optical ferrule assembly 328 back into the retracted position when the connector 322 is withdrawn from a connector adapter. In various ones of the implementations including more than one actuator 326, the connector 322 may include a biasing member 334 between each actuator 326 and the optical ferrule assembly 328 to cooperatively urge the optical ferrule assembly 328 into the retracted position.

Figure 4A:
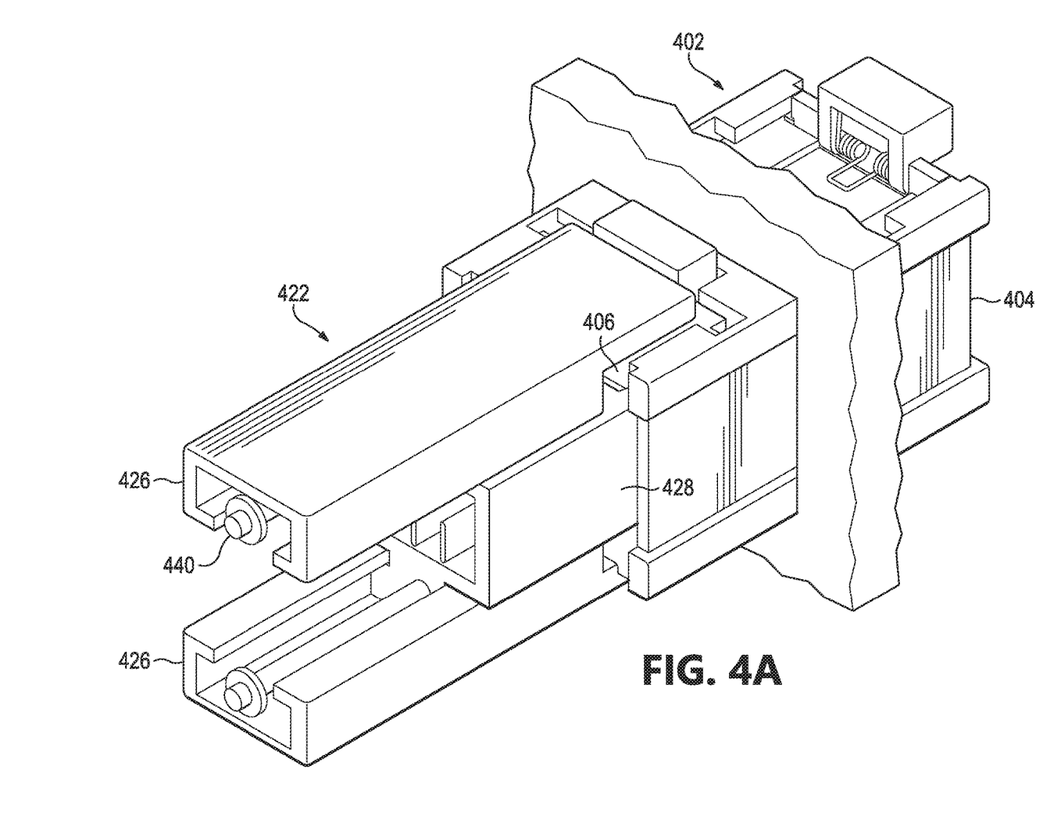
FIG. 4A-4B illustrate another example optical blind-mate connector adapter mated to another example optical blind-mate connector.
Figure 4B:
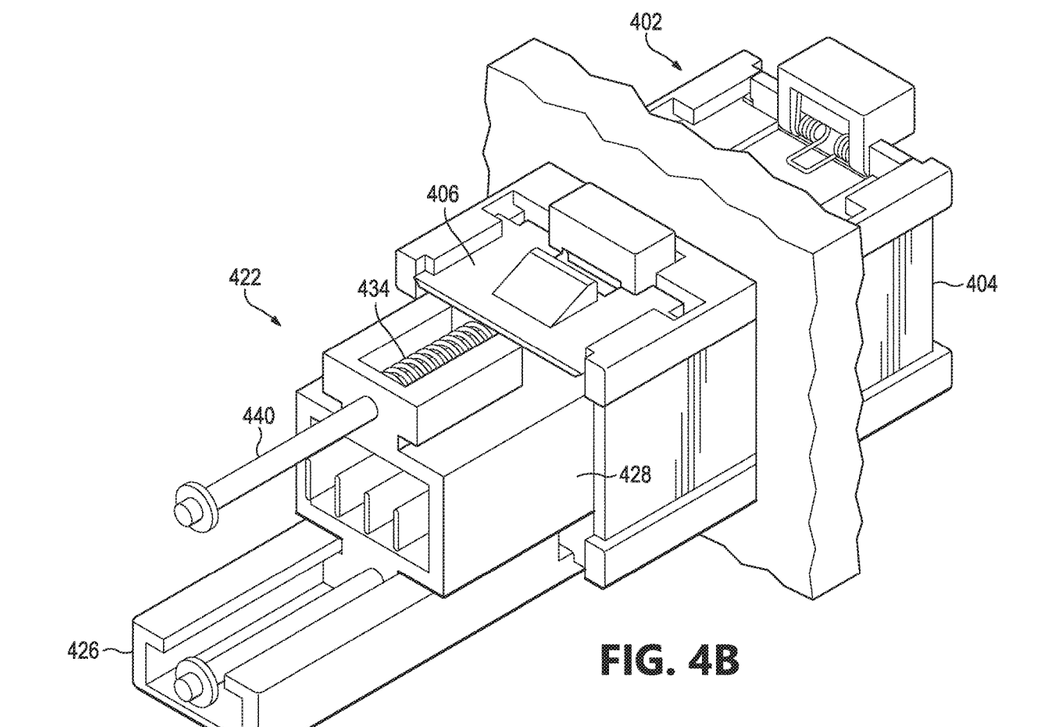

FIG. 4A illustrates a perspective view an example system including an optical blind-mate connector 422 blind-mated to an optical blind-mate adapter 402. To aid in the understanding of the structure of the optical blind-mate connector 422, a view of the connector 422 is shown in FIG. 4B with one of the actuators 426 removed to reveal an internal section of the connector 422.

As illustrated, the connector 422 may include an optical ferrule assembly 428 slidably coupled to the actuators 422. As shown, the optical ferrule assembly 428 is in the extended position and coupled to the connector 422. In this position, the shutters 406 of the adapter 402 may be disposed in an open position to allow the optical ferrule assembly 428 may extend into an interior of the sleeve 404 of the adapter 402. The connector 422 may include a biasing member 434 to urge the optical ferrule assembly 428 back into a retracted position upon withdrawal of the connector 422 from the adapter 402. In various implementations, the connector 422 may include a spring guide 440 to align and guide the biasing member 434 between the retracted and extended positions.

Figure 5A:
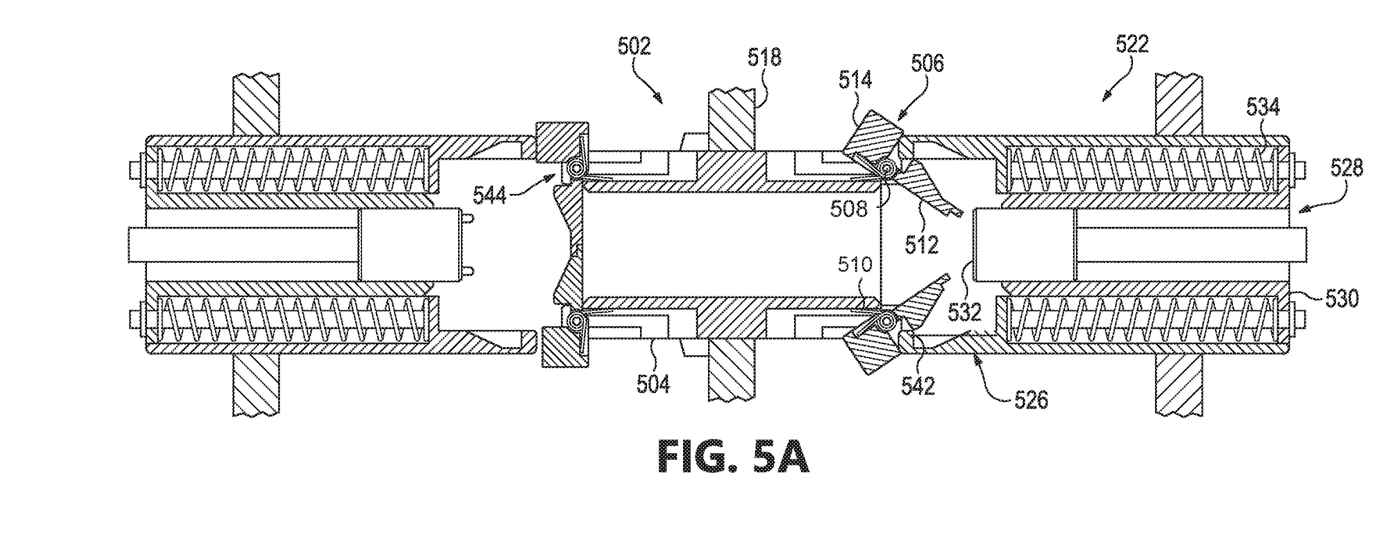
FIG. 5A-5C illustrate cross-section views of another example optical blind-mate connector being inserted into another example optical blind-mate connector adapter.
Figure 5B:
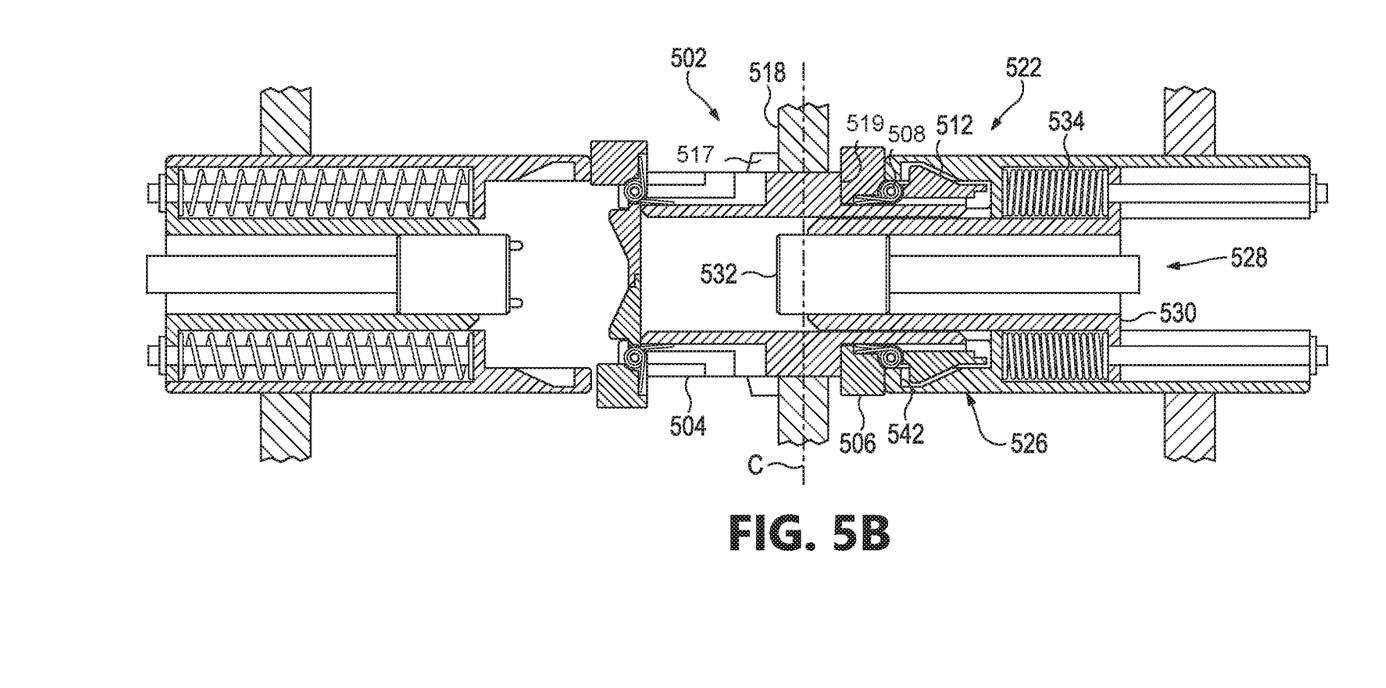
Figure 5C:
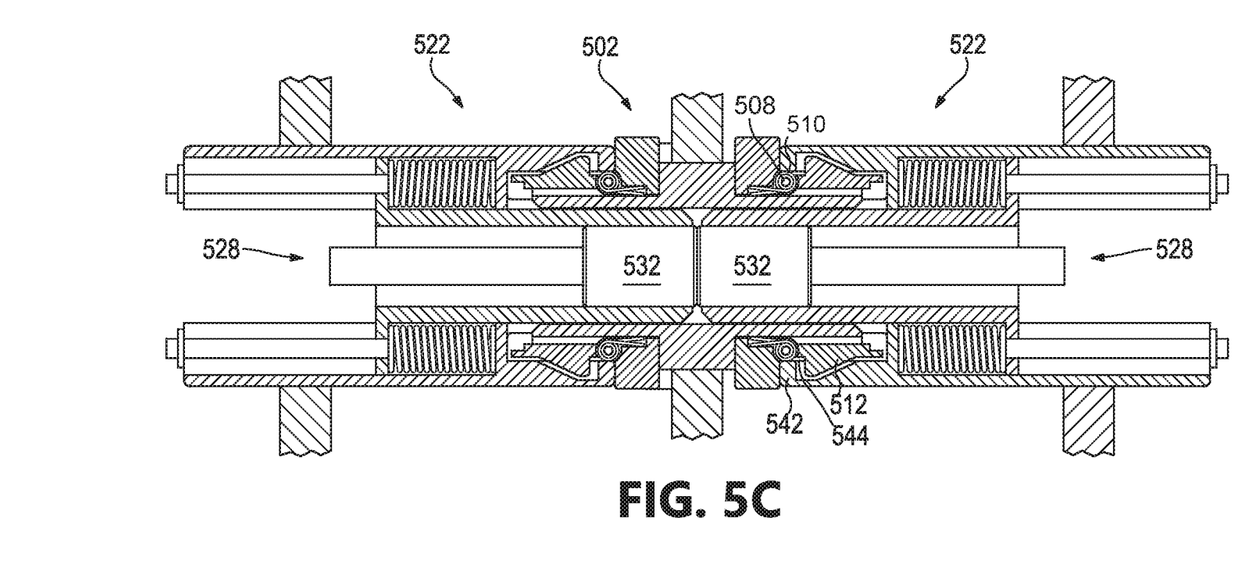

FIG. 5A-5C illustrate cross-section views of an example optical blind-mate connector 522 being inserted into an example optical blind-mate connector adapter 502. As the connector 522 is blind-mated to the adapter 502, the leading edges of the actuators 526 of the connector 522 may engage and exert a force against the shutter tabs 514 of the shutters 506 to move the shutters flaps 512 from the closed position to an open position extending away from the sleeve housing 504, as shown in FIGS. 5A and 5B.

As the connector 522 and adapter 502 are blind-mated to each other, the shutter 506 bottoms out on the shutter rest 519 and the optical ferrule assembly 528 of the connector 522 may slide from the retracted position (shown in FIG. 5A) to the extended position into the sleeve housing 504 (shown in FIG. 5B), compressing the biasing members 534. In various implementations, the actuators 526 may include a tab 542 to reversibly interlock with the adapter 502. In various ones of these implementations, the shutters 506 may include a notch 544 shaped to facilitate the reversible interlocking of the connector 522 with the adapter 502.

When blind-mated to the adapter 502, the optical ferrule assembly 528 may extend into the interior of the sleeve housing 504 of the adapter 502. In various implementations, the pivots 508 of the shutters 506 may be pushed toward the centerline, C, of the adapter 502 such that the ferrule 532 of the optical ferrule assembly 528 may extend beyond the center line, C, of the mid-plane circuit board 518 when the optical ferrule assembly 528 is fully inserted into the sleeve housing 504, as shown in FIG. 5B. In various ones of these implementations, when an opposing connector 522 is inserted fully into the adapter 502, the pivots 508 may be pushed back away from the centerline C and the ferrules 532 may be compressed back into their respective housings 530, as shown in FIG. 5C. In this arrangement, a positive mating force may be provided between opposing mated ferrules 532 to ensure adequate optical coupling between the connectors 522. When the connector 522 is withdrawn from the adapter 502, the tab 542 may pull the notch 544 to urge, in combination with the biasing member 510, the shutter flaps 512 to the closed position. In some of these implementations, the tab 542 may pull the pivots 508 away from the centerline C until the biasing members 510 snap the shutter flaps 512 to the closed position.

Various aspects of the illustrative embodiments are described herein using terms commonly employed by those skilled in the art to convey the substance of their work to others skilled in the art. It will be apparent to those skilled in the art that alternate embodiments may be practiced with only some of the described aspects. For purposes of explanation, specific numbers, materials, and configurations are set forth in order to provide a thorough understanding of the illustrative embodiments. It will be apparent to one skilled in the art that alternate embodiments may be practiced without the specific details. In other instances, well-known features are omitted or simplified in order not to obscure the illustrative embodiments.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. It is manifestly intended, therefore, that embodiments be limited only by the claims and the equivalents thereof.

What is claimed is:

1. A system comprising:
   a connector adapter including a sleeve housing and a shutter mounted on a pivot at an opening of the sleeve housing, the shutter including a shutter flap to cover the opening in a closed position and a shutter tab to receive a force to move the shutter flap from the closed position to an open position extending away from the sleeve housing, the pivot being located between the shutter flap and the shutter tab; and
   an optical connector including an actuator to engage the shutter tab to move the shutter flap to the open position, an optical ferrule assembly coupled to the actuator and arranged to slide between a retracted position and an extended position into the sleeve housing.

2. The system of claim 1, wherein the optical connecter further includes a first biasing member to urge the optical ferrule assembly into the retracted position when the optical connector is withdrawn from the connector adapter.

3. The system of claim 2, wherein the optical connector further includes a spring guide to align and guide the first biasing member between the retracted position and the extended position.

4. The system of claim 1, further comprising a second biasing member to bias the shutter flap to the closed position when the optical connector is withdrawn from the connector adapter.

5. The system of claim 1, wherein the actuator further includes a tab to reversibly interlock with a notch of the shutter to facilitate a reversible interlocking of the optical connector and the connector adapter.

6. The system of claim 5, wherein the tab pulls the notch to urge, in combination with the second biasing member, the shutter flap to the closed position when the optical connector is withdrawn from the connector adapter.

7. The system of claim 6, wherein the tab pulls a pivot of the shutter away from a centerline of the connector adapter until the second biasing member snaps the shutter flap into the closed position.

8. The system of claim 1, wherein the connector adaptor further comprises a a second shutter mounted on a second pivot at the opening of the sleeve housing, the second shutter including a second shutter flap to cover the opening in a closed position in cooperation with the first shutter flap, and a second shutter tab to receive a second force to move the second shutter flap from the closed position to an open position extending away from the sleeve housing, the second pivot being located between the second shutter flap and the second shutter tab.

9. The system of claim 8, wherein the optical connector further includes a second actuator to engage the second shutter tab to move the second shutter flap to the open position.

10. The system of claim 8, wherein the connector adaptor further comprises:
    a third shutter mounted on a third pivot at a second opening of the sleeve housing, the third shutter including a third shutter flap to cover the second opening in a second closed position, and a third shutter tab to receive a third force to move the third shutter flap from the second closed position to a second open position extending away from the sleeve housing, the third pivot being located between the third shutter flap and the third shutter tab; and
    a fourth shutter mounted on a fourth pivot at the second opening of the sleeve housing, the fourth shutter including a fourth shutter flap to cover the second opening in the second closed position in cooperation with the third shutter flap, and a fourth shutter tab to receive a fourth force to move the fourth shutter flap from the second closed position to the second open position extending away from the sleeve housing, the fourth pivot being located between the fourth shutter flap and the fourth shutter tab.

11. The system of claim 1, wherein the connector adaptor further comprises:
    a second shutter mounted on a second pivot at a second opening of the sleeve housing, the second shutter including a second shutter flap to cover the second opening in a second closed position, and a second shutter tab to receive a second force to move the second shutter flap from the second closed position to a second open position extending away from the sleeve housing, the second pivot being located between the second shutter flap and the second shutter tab.

* * * * *